United States Patent
Nguyen (10) Patent No.: US 9,330,117 B2
(45) Date of Patent: May 3, 2016

(54) BUSINESS RULES MANAGER (71) Applicant: 24/7 CUSTOMER, INC., Campbell, CA (US)

(72) Inventor: Patrick Nguyen, Alameda, CA (US)

(73) Assignee: 24/7 CUSTOMER, INC., Campbell, CA (US)

(*) Notice: Subject to any disclaimer, the term of this patent is extended or adjusted under 35 U.S.C. 154(b) by 143 days.

(21) Appl. No.: 13/908,961

(22) Filed: Jun. 3, 2013

(65) Prior Publication Data

US 2013/0332411 A1 Dec. 12, 2013

Related U.S. Application Data (60) Provisional application No. 61/657,178, filed on Jun. 8, 2012.

(51) Int. Cl.
*G06F 17/30* (2006.01)
*G06Q 10/06* (2012.01)

(52) U.S. Cl.
CPC .......... *G06F 17/30289* (2013.01); *G06Q 10/06* (2013.01); *G06Q 10/067* (2013.01)

(58) Field of Classification Search
CPC ................................................ G06F 17/30289
USPC ........................................................ 707/609
See application file for complete search history.

(56) References Cited

U.S. PATENT DOCUMENTS

| | | | |
|---|---|---|---|
| 7,668,850 B1 * | 2/2010 | Bierner .......................... | 707/694 |
| 7,827,064 B1 | 11/2010 | Foster et al. | |
| 8,386,408 B2 * | 2/2013 | Gould et al. ..................... | 706/47 |
| 8,849,694 B1 * | 9/2014 | Chatterjee et al. ........... | 705/14.1 |
| 2002/0065721 A1 * | 5/2002 | Lema et al. ..................... | 705/14 |
| 2002/0178146 A1 * | 11/2002 | Akella et al. ...................... | 707/2 |
| 2004/0088199 A1 * | 5/2004 | Childress et al. ................. | 705/4 |
| 2006/0036637 A1 | 2/2006 | Sayal et al. | |
| 2006/0089938 A1 | 4/2006 | Leonard et al. | |
| 2006/0106832 A1 | 5/2006 | Ben-Dyke et al. | |
| 2010/0023486 A1 * | 1/2010 | Baras et al. ....................... | 707/3 |
| 2010/0083183 A1 * | 4/2010 | Yan ................................ | 715/843 |
| 2010/0169551 A1 | 7/2010 | Yano et al. | |
| 2011/0179110 A1 | 7/2011 | Soloway et al. | |
| 2012/0072455 A1 | 3/2012 | Jain et al. | |
| 2012/0143811 A1 | 6/2012 | Proctor et al. | |
| 2013/0238540 A1 * | 9/2013 | O'Donoghue et al. ......... | 706/46 |

FOREIGN PATENT DOCUMENTS

WO 2006056213 A2 6/2006

* cited by examiner

*Primary Examiner* — Rehana Perveen
*Assistant Examiner* — Hicham Skhoun
(74) *Attorney, Agent, or Firm* — Michael A. Glenn; Perkins Coie LLP (57) ABSTRACT

An apparatus and method is provided for creating, updating, and deleting business rules with ease by use of a rule manager. Business rules are represented as tables that map a set of inputs to a set of outputs. Inputs are represented as enumerations with predefined allowable values. All possible unique combinations of values for a given set of inputs are automatically generated, and a business user can then set the outputs for each desired input value combination.

21 Claims, 6 Drawing Sheets

| ←——(Inputs) attributes——→ | | | ←—(Output) Settings—→ |
|---|---|---|---|
| Plan | Phone type | Market | Promo Prompt |
| I40 | Regular | Atlanta | Samsung Free Form only $35 |
| I40 | Regular | Boston | 35 free MP3 |
| I40 | Regular | Dallas | Get 50$ back |
| I40 | Blackberry | * | Get 50$ back |
| I40 | Smartphone | * | 35 free MP3 |
| I50 | * | * | 35 free MP3 |
| BTM1 | Regular | * | 35 free MP3 |
| BTM1 | Blackberry | Atlanta | Get 50$ back |

Rule Table 204

| Set of Tuples 205 | | Settings 206 (Output Values) | |
| --- | --- | --- | --- |
| Market | Phone | Upgrade Supported | Allowed additional features |
| Atlanta | Black Berry | yes | Chat, Ring tones |
| Atlanta | iPhone | yes | Chat, Ring tones, Video streaming |
| Atlanta | Android | no | Ring tones |
| Boston | Black Berry | yes | Ring tones |
| Boston | iPhone | no | Chat, Ring tones |
| Boston | Android | yes | Chat, Ring tones |

FIGURE 2B

| | ←——(Inputs) attributes——→ | | ←——(Output) Settings——→ |
|---|---|---|---|
| Plan | Phone type | Market | Promo Prompt |
| I40 | Regular | Atlanta | Samsung Free Form only $35 |
| I40 | Regular | Boston | 35 free MP3 |
| I40 | Regular | Dallas | Get 50$ back |
| I40 | Blackberry | * | Get 50$ back |
| I40 | Smartphone | * | 35 free MP3 |
| I50 | * | * | 35 free MP3 |
| BTM1 | Regular | * | 35 free MP3 |
| BTM1 | Blackberry | Atlanta | Get 50$ back |

BUSINESS RULES MANAGER

CROSS REFERENCE TO RELATED APPLICATIONS

This application claims priority to U.S. provisional patent application Ser. No. 61/657,178, filed Jun. 8, 2012, which application is incorporated herein in its entirety by this reference thereto.

BACKGROUND OF THE INVENTION

1. Technical Field

The invention relates to automated business systems. More particularly, the invention relates to a user friendly business rules management system.

2. Description of the Background Art

A business rules engine is a software system that executes one or more business rules in a runtime production environment. Business rule engines typically support rules, facts, priority (score), mutual exclusion, preconditions, and other functions. Business rule engine software is commonly provided as a component of a business rule management system which, among other functions, provides the ability to create, read, modify, and delete the rules, verify consistency of rules definitions, and define the relationships between different rules.

Most existing business rule frameworks rely on sets of conditional expressions that require Boolean operators, such as AND, OR, and NOT, which are difficult for business users to write and understand, especially when there are more than a few expressions.

Further, in existing systems, when multiple rules are used, they must be ordered. A common approach is to evaluate the rules in order, with later rules overriding earlier ones. A new rule cannot be simply added to the start or the end of the list. Instead, it must be added so that its order is after the rules that it should override, but before the rules that it should be overridden by.

Furthermore, a system or user who wants to compute a desired output variable cannot simply scan the rules from the start until one is found whose conditions match the current state of the inputs. Instead, all the later rules must also be considered in case one overrides a preceding rule. As a result, the process of creating and evaluating rules is time consuming and confusing.

Therefore, present systems make the tasks of making and updating business rules difficult and time consuming. This complexity often prevents non-technical users from understanding and managing the business rules in their organization.

SUMMARY OF THE INVENTION

Embodiments of the invention provide an apparatus and method for creating, updating, and deleting business rules with ease by use of a rule manager. The invention represents business rules as tables that map a set of inputs to a set of outputs. Furthermore, inputs are represented as enumerations with predefined allowable values. Thus, an embodiment of the invention automatically generates all possible unique combinations of values for a given set of inputs, and allows a business user to set the outputs for each desired input value combination.

DETAILED DESCRIPTION OF THE INVENTION

Embodiments of the invention provide an apparatus and method for creating, updating, and deleting business rules with ease by use of a rule manager. Thus, an embodiment of the invention automatically generates all possible unique combinations of values for a given set of inputs, referred to as attributes, and allows a business user to set the output values for each desired input combination. A presently preferred embodiment of the invention provides an administrative environment for creating, maintaining and managing business rules, and a runtime interface with which applications can evaluate the rules in real-time. This makes a business rules system in accordance with the invention more readable, updateable, and understandable and enhances the experience of the business user and any other person interested.

Embodiments of the invention provide a general purpose rules manager. The invention allows data to be externally documented, rather than buried in the system code, thus enabling the business user to create, read, modify, and delete rules with ease by himself, without involving technical assistance. The invention also allows a business user to perform updates of the business rules in real time. The invention provides a system that is understandable to business users, thus making it more usable.

In an embodiment of the invention, a rules manager uses tables to map attributes, i.e. the inputs or independent variables, to settings, i.e. the outputs or dependent variables. Attributes are used to represent the known state of an application session in which rules are evaluated. For example, attributes could be used to capture the profile, transactions, and behavior of a particular user. A setting is a parameter of interest to the application. In the case of an application that recommends a new mobile phone to a customer, the attributes could be the customer's location, current mobile phone, and wireless plan, and the settings could be the recommended phone, recommended plan, available accessories, and a special promotional offer.

In an embodiment, each attribute is an enumeration, which means that it has a set of allowable values referred to as enumerators. If an attribute represents an entity with discrete values, e.g. locations, phone types, phone numbers, enumerators may represent one more discrete values through association, classification, grouping or any other technique that assigns every discrete value to at most one enumerator. If an attribute represents an entity with numerical values, e.g. prices, temperatures, etc., enumerators may represent one or more ranges of values such that every numerical value may belong to at most one enumerator.

A tuple represents a possible combination of enumerators for one or more attributes. When a set of attributes is declared, a rules manager can automatically generate the tuples that represent all the possible combination of enumerators. A business user can then define the outcome associated with a tuple by specifying the value of settings that correspond to each tuple. The outcome of a tuple is independent from the outcome of any other tuple, i.e. the outcome of one tuple cannot override the outcome of another tuple. A user who wants to understand the outcome for a particular combination of enumerators therefore only needs to find the tuple that represents that combination of enumerators.

Embodiments of the invention also allow the use of a wild card entry as an attribute value in a tuple to indicate all possible enumerators for that attribute. An operation is provided to expand a tuple with a wild card entry to a set of tuples, each of which contains a single enumerator of the expanded attribute. A reverse operation is also available that collapses a set of all tuples that are identical, except for the value of a given attribute, into a single tuple that has a wild card entry for that attribute.

Figure 1:
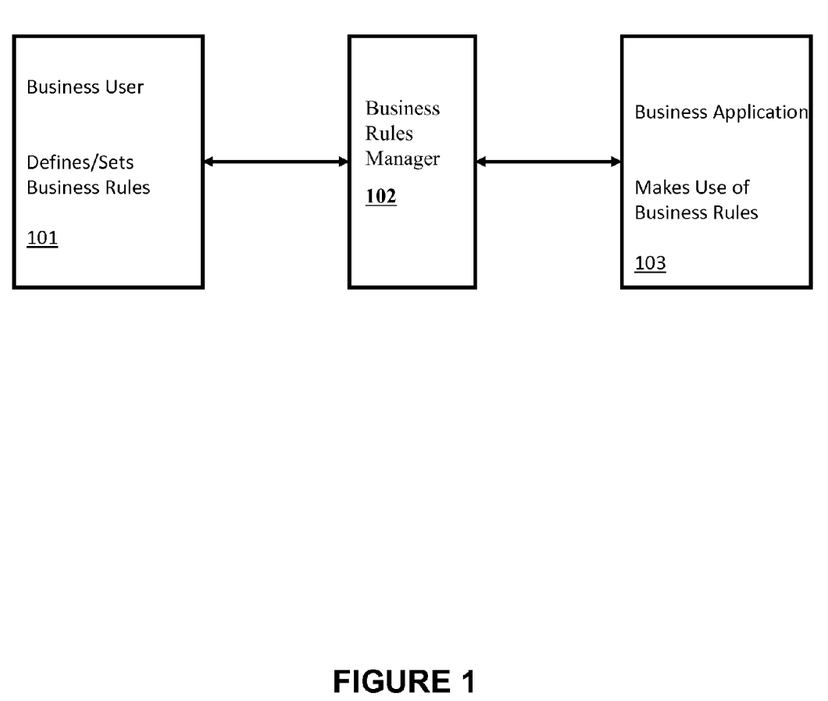
FIG. 1 is a block schematic diagram showing a general system in an automated business environment according to the invention.

FIG. 1 is a block schematic diagram showing an automated business environment according to the invention. The invention as depicted comprises a business user 101, a business rules manager 102, and a business application 103. The application can be any general purpose system supported by a backend data base. The application calls upon a business rules manager, as described in detail in the description to follow. The business user can access the administrative environment of the business rules manager to create, read, modify, and delete business rules. The application sets attributes to values that represent the known state of a particular session, and uses the business rules manager to return the values of desired settings for that particular session.

Figure 2A:
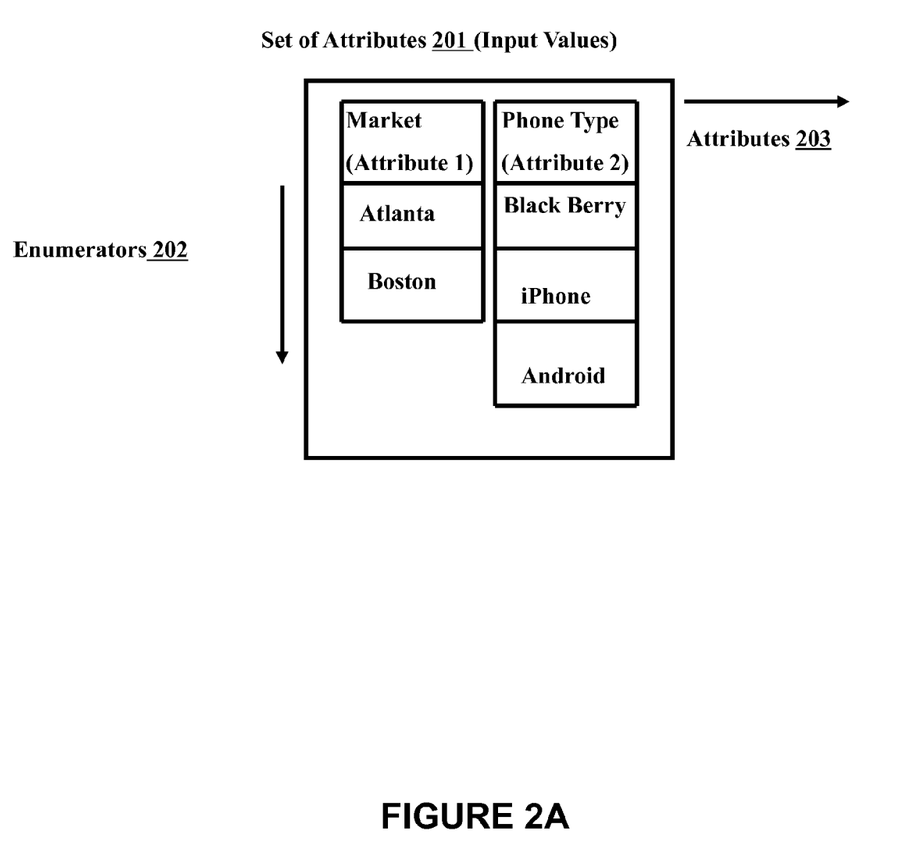
FIG. 2A is a block schematic diagram showing the manner in which Input data is arranged in the form of Attributes and Enumerators according to the invention.
Figure 2B:
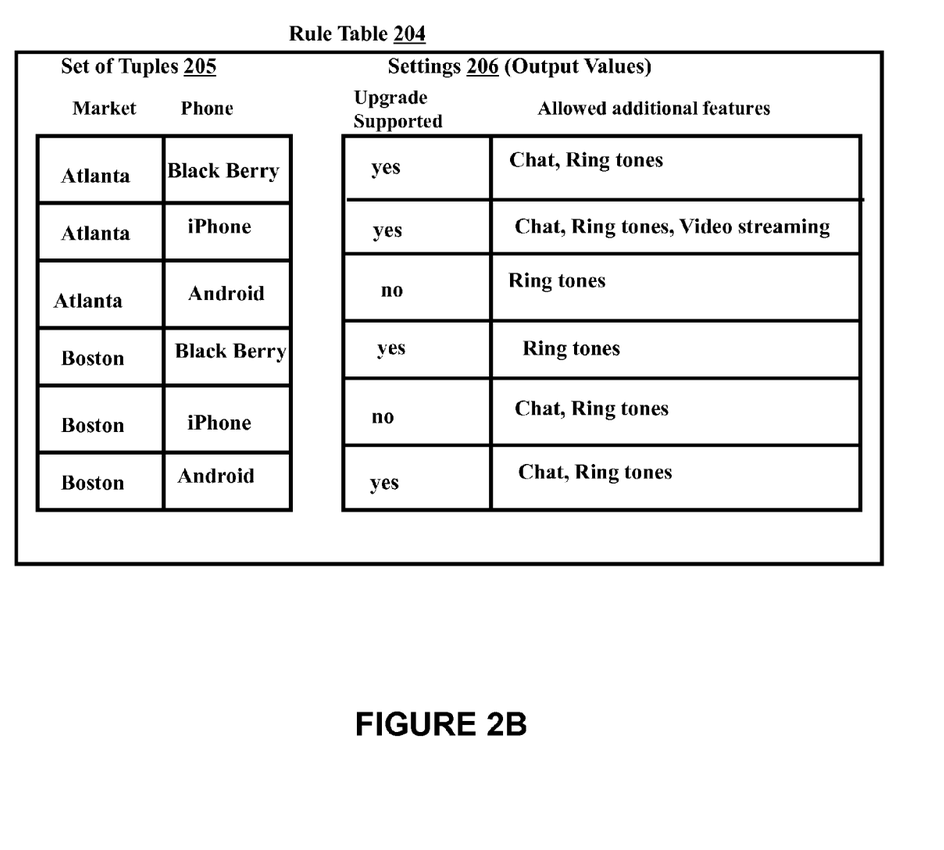
FIG. 2B shows a rules table that maps a set of inputs to a set of outputs, resulting in a single output combination for a selected combination of inputs according to the invention.

FIG. 2A illustrates the manner in which input data 201 is arranged in the form of attributes 203 and enumerators 202, and FIG. 2B shows a rules table 204 that maps each combination of enumerators of the attributes 205 to the values of one or more settings, i.e. the outputs 206, according to the invention. The embodiment of the invention shown in FIGS. 2A and 2B uses an illustrative example to describe the rules table in detail, but it should not be considered as a limiting application. The example in FIGS. 2A and 2B concerns an upgrade policy and the features that a service provider offers to its customers, based on the customer's market and phone type.

FIG. 2A shows a set of attributes 201, in which each attribute 203 has a set of enumerators, i.e. possible values 202.

FIG. 2B shows a rules table 204 maintained by the business rules manager comprising of set of tuples 205 and settings 206. An attribute 203 is an input variable, such as market, type of phone, etc. Each attribute has a set of allowed values referred to as enumerators 202. For example, the Market attribute has enumerators, such as the names of the markets, e.g. Boston, Atlanta, etc., while the Phone Type attribute has enumerators, such as the types of phones, e.g. iPhone, Android, Blackberry, etc.

The attributes and enumerators can be accessed, updated, or newly created by the business user. The rule runtime system ensures that at each point in time, every attribute is set to an allowable value. This can be achieved by declaring a default enumerator for the attribute that is used to initialize the attribute's value at the start of each session. Moreover, any attempt to set the attribute to a value that is not among the set of enumerators is rejected. In such cases, the attribute can retain its previous value or can be reset to the default enumerator according to different embodiments of the invention.

The rules table contains a set of tuples, where each tuple represents one or more attribute value combinations. The rules table pre-fills the set of tuples that represents all of the possible combinations of enumerators by generating the Cartesian product of all attributes. Some of the pre-filled tuples can be removed by the business user if the combinations of enumerators they represent are not necessary.

The system allows the value of a setting (output) to be specified for each tuple by the business user. As shown in the rules table 204, Atlanta—Blackberry, Atlanta—iPhone, Boston—Blackberry, Boston—iPhone are the possible set of tuples pre-filled by the system while Yes—Chat-Ringtones, Yes—Ringtones, No—Ringtones are settings 206 inputted by the business user.

The system uses a data structure that holds only one instance of each tuple, thus ensuring that each possible attribute value combination is represented by one and only one tuple. As shown, for the tuple that represents the Atlanta market and phone type iPhone there is one and only one row of settings (output) 206 specifying whether upgrades are supported and the additional features allowed. As for the example in this embodiment, upgrades are supported, and the additional features allowed are: Chat, ring tones, and video streaming.

Another embodiment of the invention allows addition, deletion, or modification of the enumerators for an attribute. The system recalculates the set of tuples upon each enumerator change to ensure that all possible valid attribute value combinations are present, and that no invalid attribute value combinations, i.e. those that contain attribute values that are not in the attribute's set of enumerators, are present. When an enumerator is added to an attribute, the system automatically updates all tables that contain that attribute to add the tuples that contain the new enumerator. The setting values for the previously existing tuples are left unchanged. When an enumerator is removed from an attribute, the system automatically updates all tables that contain that attribute by deleting all tuples that include the removed enumerator.

A rules table maps one or more attributes to one or more settings. When two settings are in one rules table, the two settings must both depend on the same set of attributes. Separate rules tables can be created to support different sets of attributes and the settings that depend on those attributes.

The state of a particular session is represented by the values of the attributes. A tuple represents an attribute value combination. Each row of the rules table contains a unique tuple. As a result, the state of the session corresponds to a specific row and the order of the rows is irrelevant. To find a combination of attribute values, rows can be sorted or filtered in any way. Thus, a business user can specify an output variable (setting) for a tuple without worrying about the other tuples.

Another advantage of the invention is that the business application has knowledge of the attributes and settings, but not of the contents of the rules tables themselves, i.e. the application does not need to know the set of attributes that affect a setting. The business application is responsible for setting the values of the attributes to represent the state of the current session and can ask the business rules manager to determine the values of one or more settings. In one embodiment of the invention, each setting is present in only one rules table. Thus, the application does not need to specify the rules table to use; instead, the system looks up the single rules table that contains the desired setting. Therefore, the rules tables can be updated and restructured, e.g. attributes can be added or removed and settings can be moved from one table to another, without touching the business application. The application automatically picks up the latest business rules without any recompilation or redeployment.

Figure 3:
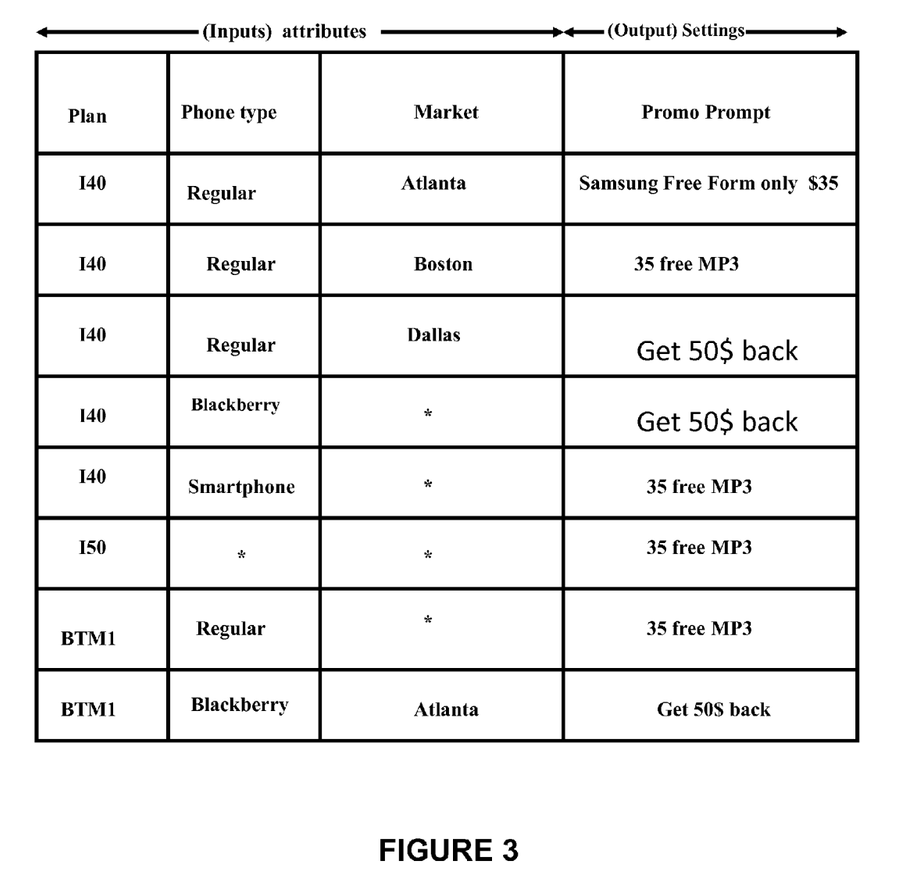
FIG. 3 shows a table that illustrates an embodiment of the invention which includes a wild card feature.

FIG. 3 illustrates another embodiment of the invention by providing an illustrative example that explains the wild card feature. A wildcard represents all enumerators for an attribute. This example shows a rules table having attributes (inputs), such as plan, phone type, and market that a service provider can offer, while the settings (outputs) display promotional offers for the input combinations. In the example of FIG. 3, the tuple with Plan I40 and Phone Type Blackberry has a wildcard in the Market attribute column, which indicates that the tuple represents all possible enumerators of the Market attribute, i.e. all Markets.

Attribute order is significant when using a wildcard. If a tuple has a wildcard in one attribute, then all the following attributes are also set to wild cards. This requirement ensures that each possible attribute value combination is represented by one and only one tuple, This can be seen in the row corresponding to Plan I50, where a wildcard entry in the 'Phone type' column automatically sets the following attribute (Market) with a wildcard.

A tuple can represent many attribute value combinations through the use of wildcards. Collapsing tuples replaces a set of related tuples with a single tuple that contains wildcards. Expanding a tuple that has a wildcard replaces it with many tuples by expanding the wildcard into all of its possible value combinations.

In one embodiment, the invention allows the rules to be either system-managed, i.e. allowing the system to generate rules for all combinations of all input values, or client-managed (business user), i.e. allowing a client to define rules for a subset of the attribute value combinations.

The invention provides an ability to work within an administration framework that allows role-based access control to various rule operations. Embodiments of the invention support multiple versions of the rule base, thus allowing multiple rule bases to be in use concurrently during different parts of a business application's life cycle. For example, different versions of the rule base may be used for development and production versions of the application, thus allowing rules to be tested and verified in the development environment before being promoted to the production environment.

In one embodiment, the invention supports snapshots that capture the state of the rule base at a point in time, for later reinstatement. The system provides both automatic snapshots and user-determined snapshots for backup and recovery in cases where changes have been made to the rule base that need to be rolled back.

Figure 4:
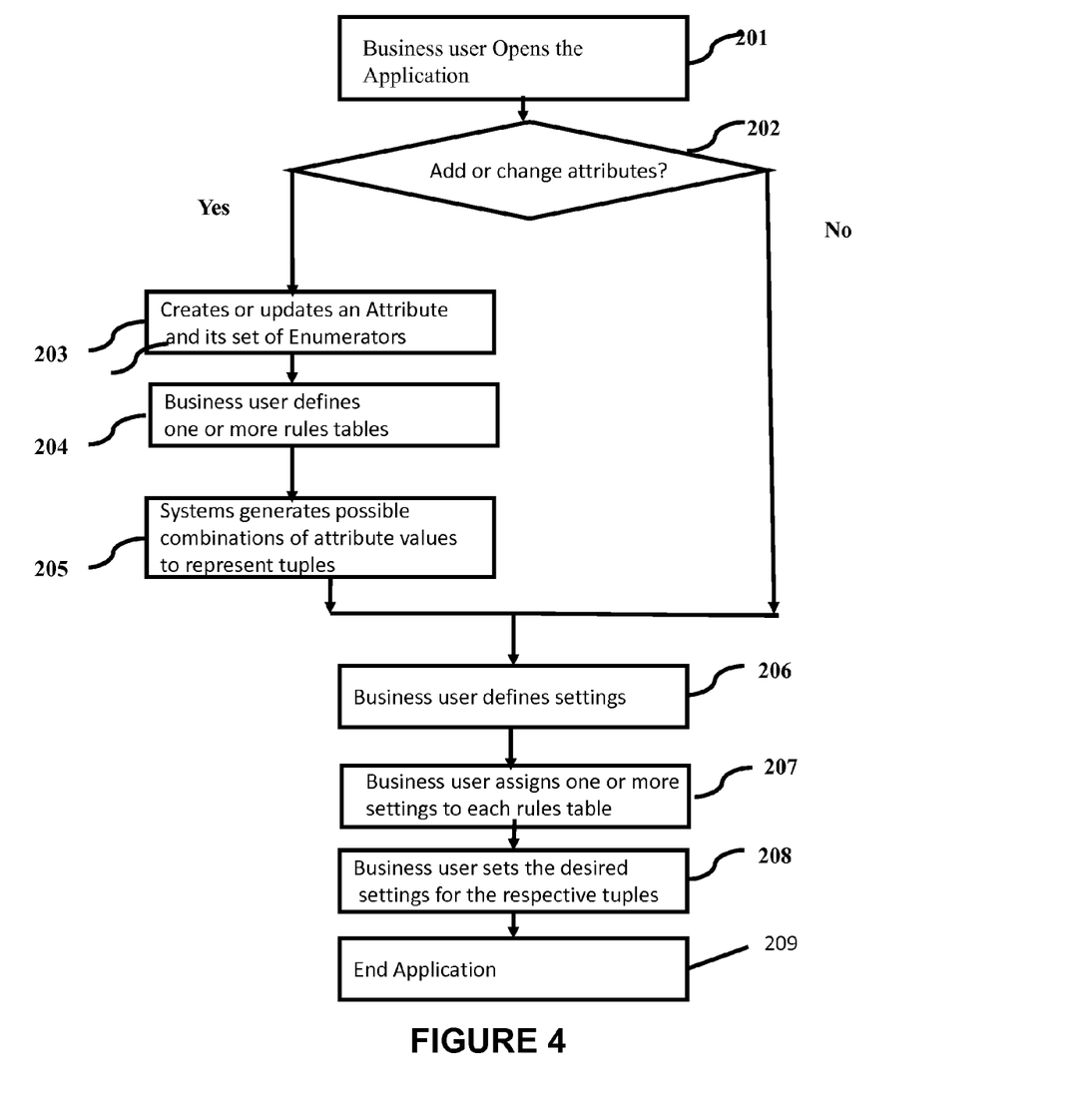
FIG. 4 is a flowchart that shows, for a rules manager, the logical steps a business user goes through to define and update business rules according to the invention.

FIG. 4 is flow diagram showing operation of the rules manager module via the logical steps that a business user can go through to define and update business rules according to the invention. As shown in FIG. 4, the business user opens the business rules manager administrative environment (201) and tries to perform actions, such as adding a new rules table, updating existing rules tables, etc. The business rules manager checks if the business user wants to add or update an attribute (202). If so, the business user creates or updates an attribute and its set of enumerators (203). The business user then defines one or more rules tables, each of which contains a specified set of attributes (204). The business rules manager then generates tuples to represent possible attribute value combinations for each rules table (205). The business user defines the outputs (settings) that are maintained by the system (206). The business user then assigns one or more settings to each rules table. In one embodiment of the invention, each setting can only be assigned to one rules table. In each rules table, the business user can then specify the value of a setting for each tuple of interest (208), after which the process is completed (209). An embodiment of the invention performs the task of maintaining data combinations for the user and can be used across any business model and is not limited to the examples illustrated herein.

Computer Implementation

Figure 5:
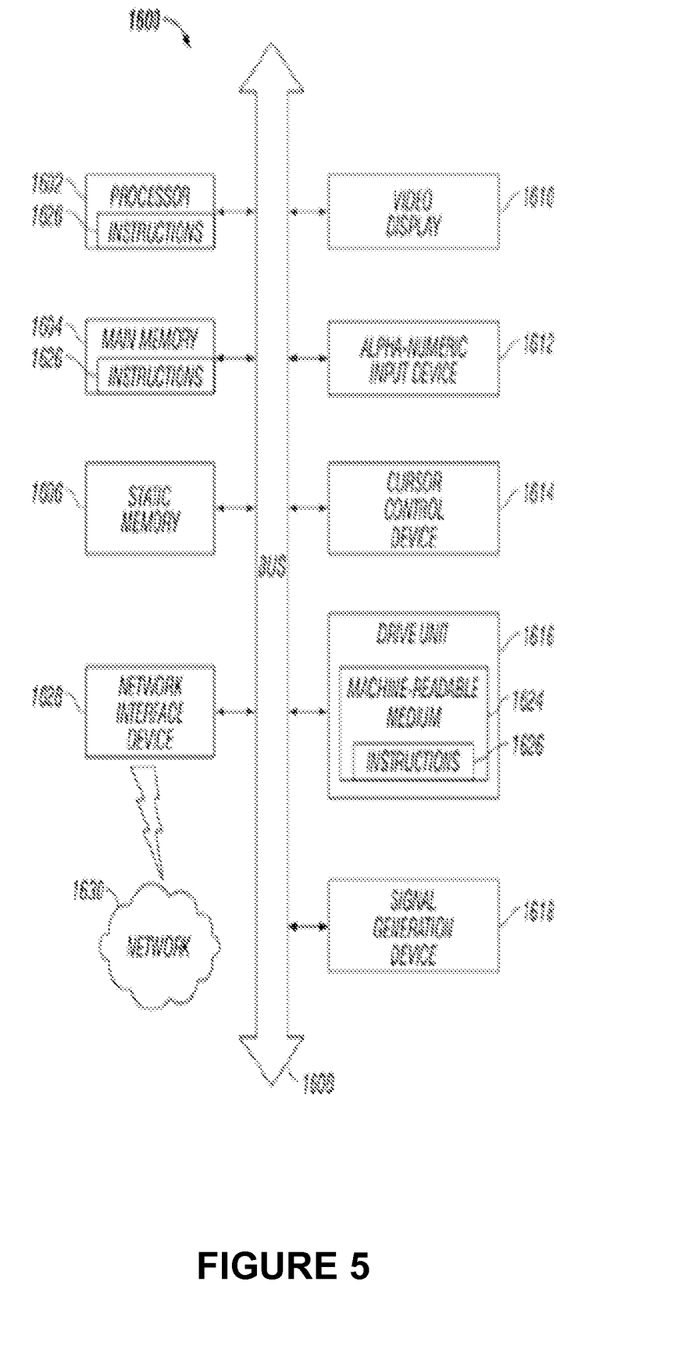
FIG. 5 is a block schematic diagram that depicts a machine in the exemplary form of a computer system within which a set of instructions for causing the machine to perform any of the herein disclosed methodologies may be executed.

FIG. 5 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant, a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the invention. Accordingly, the invention should only be limited by the Claims included below.

The invention claimed is:

1. A computer implemented method for creating, updating, and deleting business rules, comprising:
   a processor accepting a set of defined attributes, which represent a known state of an application session in which rules are evaluated, where each attribute is an enumeration with a set of enumerators;
   said processor accepting a set of rules tables, each of which contains one or more of the defined attributes;
   a rules manager automatically generating all possible unique combinations of values for a given set of attribute value;
   for each rules table, said processor generating a set of tuples, where each tuple represents one or more respective attribute value combinations and where no two tuples represent the same attribute value combination;
   for each rules table, said processor accepting a set of settings, where the setting is assigned a value for each tuple;
   A runtime interface for setting outputs for each desired attribute value combination in real-time and with which an application sets each attribute to a value and
   said rules manager providing the value of a setting requested by the application by using a rules table associated with the setting and looking up the setting value assigned to the tuple whose combination of enumerators matches the current value of the corresponding attributes.

2. The method of claim 1, said rules manager providing an administrative environment for creating, maintaining, and managing attributes, settings, and rules tables, and a runtime interface with which said rules tables look up and return setting values in real-time.

3. The method of claim 1, wherein said processor automatically generates for each rules table one or more tuples, each of which represents a unique combination of enumerators for the attributes present in the rules table, and which collectively represent all possible combinations of said enumerators for said attributes in the rules table.

4. The method of claim 3, further comprising:
   removing from a rules table a combination of attribute values that are of no interest, wherein a subset of the possible attribute value combinations remain in the rules table.

5. The method of claim 1, wherein the value of a setting assigned to a tuple is independent from the setting value of any other tuple, such that the setting value of one tuple cannot override a setting value of another tuple.

6. The method of claim 1, wherein said processor determines a setting value from a rules table by finding a tuple that represents said combination of input values in effect at the time of the request.

7. The method of claim 3, said processor further providing:
   a wild card entry for use as an attribute value in a tuple to indicate all possible enumerators for that attribute; and
   an ordering of attributes in a rules table wherein when a tuple has a wildcard in one attribute, then all following attributes are also set to wild cards.

8. The method of claim 7, said wild card entry further comprising an operation for expanding a tuple with said wild card entry to a set of tuples, each of which contains a unique enumerator value of the expanded attribute.

9. The method of claim 7, said wild card entry further comprising a reverse operation for collapsing a set of tuples that are otherwise identical, except for an enumerator value of a given attribute in each tuple, into a single tuple that has a wild card entry for that attribute.

10. The method of claim 1, wherein every attribute has a default value, wherein when a business application does not explicitly set a value of an attribute during an application session, said attribute is considered to have a value equal to a default value.

11. The method of claim 1, wherein every attribute is set to an allowable value at each point during an application session.

12. The method of claim 1, wherein each setting is associated with only one rules table, wherein the rules table to use for a setting is automatically determined without a business application explicitly specifying the rules table to use.

13. The method of claim 1, further comprising:
   said business rules manager configured for responding to a business application, when said business application calls upon said business rules manager, by evaluating settings (outcomes or output variables) for said business application.

14. The method of claim 1, wherein each possible value combination for an attribute is represented by one and only one tuple.

15. The method of claim 1, further comprising:
   said rules manager recalculating said set of tuples for a rules table in response to any of addition, deletion, and modification of an attribute enumerator to ensure that all possible valid attribute value combinations are present, and that no invalid attribute value combinations are present, wherein invalid attribute value combinations are those that contain at least one attribute value that is not in its corresponding attribute's set of enumerators.

16. The method of claim 1, further comprising:
   said rules manager automatically updating all tables that contain an attribute when an enumerator is added to said attribute to ensure that all possible attribute value combinations are represented.

17. The method of claim 1, further comprising:
   said rules manager automatically updating all tables that contain an attribute when an enumerator is removed from that attribute by deleting all tuples that include the removed enumerator.

18. The method of claim 1, further comprising:
   said rules manager sorting or filtering rows in a rules table to present a combination of attribute values of interest to a business user.

19. The method of claim 1, wherein a business application has knowledge of said attributes and settings, but not of said tuples or rows within said rules table;
   wherein updating and restructuring of said rules table by adding or
   removing attributes and by moving settings from one rules table to another is performed independently of, and without impact on, said business application.

20. The method of claim 1, further comprising:
   multiple versions of said rules table; wherein multiple rules tables can be in use concurrently.

21. The method of claim 1, further comprising: said rules manager capturing snapshots of the state of said rules table at a point in time, for later reinstatement.

* * * * *